US012598425B2

(12) United States Patent
Kettering et al.

(10) Patent No.: US 12,598,425 B2
(45) **Date of Patent: *Apr. 7, 2026**

(54) PASSIVE HEADSET WITH DYNAMICALLY CONTROLLED LEDS

(71) Applicant: Voyetra Turtle Beach, Inc., White Plains, NY (US)

(72) Inventors: Travis Kettering, Campbell, CA (US); Christopher Church, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/743,515

(22) Filed: May 13, 2022

(65) Prior Publication Data

US 2022/0272455 A1 Aug. 25, 2022

Related U.S. Application Data

(63) Continuation of application No. 16/559,319, filed on Sep. 3, 2019, now Pat. No. 11,368,789, which is a (Continued)

(51) Int. Cl.
*H04R 5/04* (2006.01)
*F21V 23/02* (2006.01)
(Continued)

(52) U.S. Cl.
CPC ............... *H04R 5/04* (2013.01); *F21V 23/02* (2013.01); *H05B 45/20* (2020.01); *H05B 45/30* (2020.01); *H05B 47/12* (2020.01)

(58) Field of Classification Search
CPC .. H04R 5/04; H04B 10/505; H04B 10/50575; H04B 10/5051; H04B 1/04;
(Continued)

(56) References Cited

U.S. PATENT DOCUMENTS 5,914,914 A * 6/1999 Moran .................. G09B 5/065 600/28
7,579,958 B2 * 8/2009 Wallace ............... H04R 29/001 340/815.45
(Continued)

OTHER PUBLICATIONS

Int'l Search Report and Written Opinion Appln No. PCT/US2015/049141 mailed Jan. 15, 2016.

*Primary Examiner* — Lun-See Lao
(74) *Attorney, Agent, or Firm* — McAndrews, Held & Malloy, Ltd.

(57) ABSTRACT

A method and system for a passive headset with dynamically controlled LEDs, where the method comprises, in a passive headset comprising speakers, light emitting diodes (LEDs), and LED driver circuitry: receiving an electrical signal that includes an audio signal and an LED control signal, separating the audio signal and the LED control signal, communicating the audio signal to the speakers, communicating the LED control signal to the LED driver circuitry, and generating a bias voltage for each of the one or more LEDs utilizing the LED driver circuitry and the output LED control signal. A light output of the one or more LEDs may be configured utilizing the generated bias voltage. The amplifier may include a mixer that sums an audio signal with a control signal.

20 Claims, 4 Drawing Sheets

Related U.S. Application Data continuation of application No. 15/948,474, filed on Apr. 9, 2018, now Pat. No. 10,401,009, which is a continuation of application No. 14/849,166, filed on Sep. 9, 2015, now Pat. No. 9,939,139.

(60) Provisional application No. 62/048,241, filed on Sep. 9, 2014.

(51) Int. Cl.

*H05B 45/20* (2020.01)
*H05B 45/30* (2020.01)
*H05B 47/12* (2020.01)

(58) Field of Classification Search

CPC .............. H04B 10/2589; H04B 10/502; H04N 9/3164; H04N 9/3182; H04N 1/2346; H04N 1/295; H04N 1/4015; H04N 21/42204; H04N 5/57; H04N 9/3155; H04N 1/40056; H04N 25/60; H04N 3/14; H03G 3/3084

USPC .............................................................. 381/74

See application file for complete search history.

(56) References Cited

U.S. PATENT DOCUMENTS

| | | | | |
|---|---|---|---|---|
| 8,715,152 | B2 | 5/2014 | Puria et al. | |
| 9,939,139 | B2 * | 4/2018 | Kettering | H05B 45/20 |
| 2004/0066942 | A1 * | 4/2004 | Bank | H04R 3/00 381/116 |
| 2005/0079885 | A1 * | 4/2005 | Patino | H04L 65/4061 455/518 |
| 2007/0254589 | A1 | 11/2007 | Sloan et al. | |
| 2012/0020479 | A1 * | 1/2012 | Zhang | H04R 9/025 381/17 |
| 2014/0126755 | A1 | 5/2014 | Strasberg | |

* cited by examiner

PASSIVE HEADSET WITH DYNAMICALLY CONTROLLED LEDS

CLAIM OF PRIORITY

This application is a continuation of U.S. application Ser. No. 16/559,319 filed on Sep. 3, 2019, which is a continuation of U.S. application Ser. No. 15/948,474 filed on Apr. 9, 2018, now U.S. Pat. No. 10,401,009, which is a continuation of U.S. application Ser. No. 14/849,166 filed on Sep. 9, 2015, now U.S. Pat. No. 9,939,139 which claims priority to and the benefit of U.S. Provisional Application No. 62/048,241 filed on Sep. 9, 2014, now expired. The aforementioned documents are hereby incorporated herein by reference in their entirety.

INCORPORATION BY REFERENCE

N/A

TECHNICAL FIELD

Aspects of the present application relate to audio headsets, and more specifically, to methods and systems for a passive headset with dynamically controlled LEDs.

BACKGROUND

Limitations and disadvantages of conventional approaches to headset LED indicators will become apparent to one of skill in the art, through comparison of such approaches with some aspects of the present method and system set forth in the remainder of this disclosure with reference to the drawings.

BRIEF SUMMARY

Methods and systems are provided for a passive headset with dynamically controlled LEDs, substantially as illustrated by and/or described in connection with at least one of the figures, as set forth more completely in the claims.

DETAILED DESCRIPTION

Figure 1:
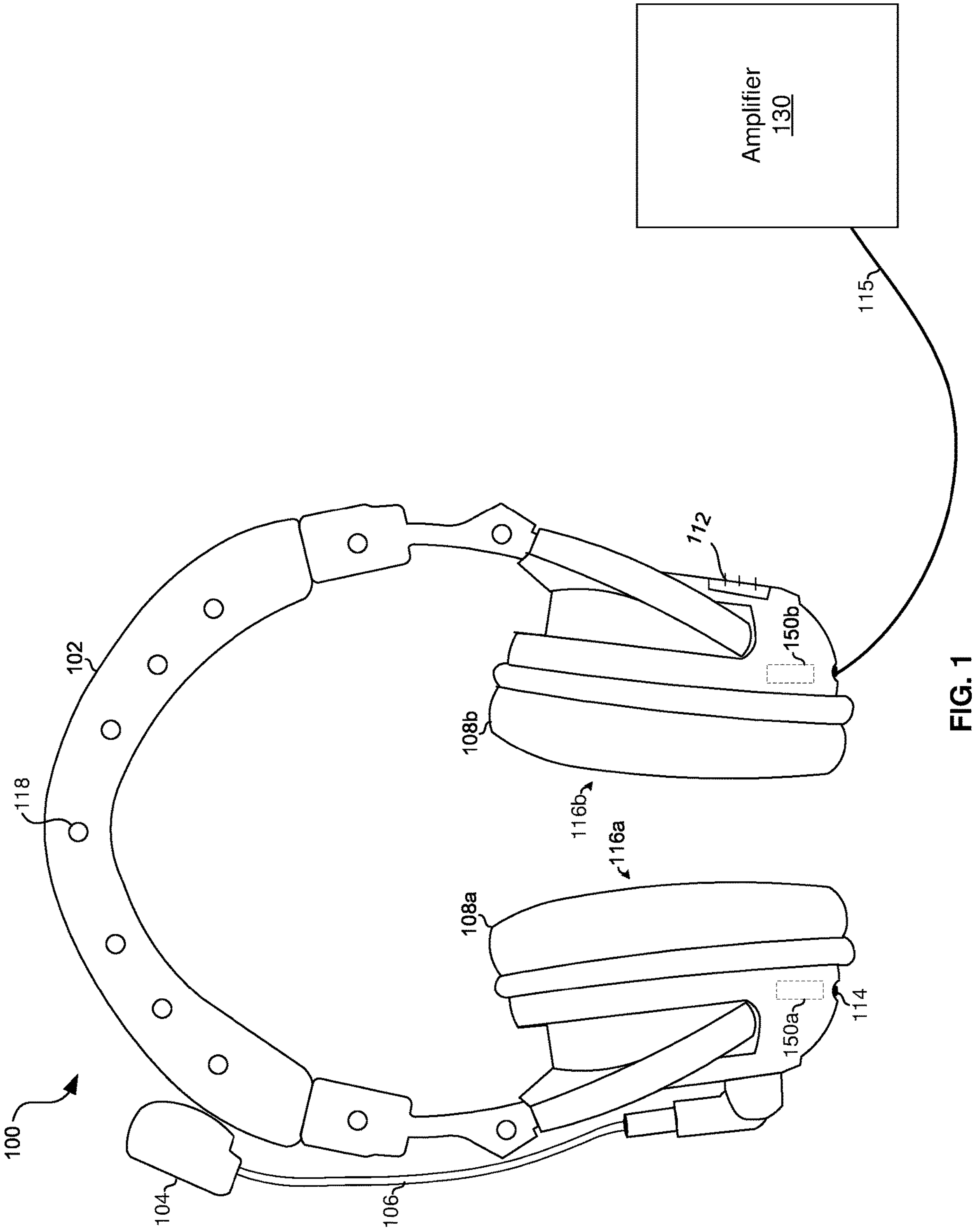
FIG. 1 illustrates an example headset with dynamically controlled LEDs, in accordance with an example embodiment of the present disclosure.

Certain aspects of the disclosure may be found in a passive headset with dynamically controlled LEDs. Example aspects of the disclosure may comprise, in a passive headset comprising speakers, one or more light emitting diodes (LEDs), and LED driver circuitry: receiving an electrical signal comprising an audio signal and an LED control signal, filtering out the LED control signal from the received electrical signal and communicating a resulting output audio signal to the speakers, filtering out the audio signal from the received electrical signal and communicating a resulting output LED control signal to the LED driver circuitry, generating a bias voltage for each of the one or more LEDs utilizing the LED driver circuitry and the output LED control signal, and configuring a light output of the LED utilizing the generated bias voltage. An amplifier coupled to the headset via an audio cable may generate the received electrical signal. The amplifier may comprise audio signal generation circuitry and control signal generation circuitry. The amplifier may comprise a mixer that sums an audio signal from the audio signal generation circuitry with a control signal from the control signal generation circuitry. The electrical signal may be received via a 4-pole audio cable. The LED driver circuitry may comprise voltage multiplier circuitry that comprises one or more stages, each stage with a capacitor and a diode pair. The LED driver circuitry may comprise a step-up transformer. The headset may comprise a low-pass filter that filters out the LED control signal and allows the audio signal to pass. The headset may comprise a band-pass filter that filters out the audio signal and allows the LED control signal to pass to the LED driver circuitry. The band-pass filter may comprise a plurality of filters each tuned to a LED control signal for a different LED of the one or more LEDs.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

FIG. 1 illustrates an example headset with dynamically controlled LEDs, in accordance with an example embodiment of the present disclosure. Referring to FIG. 1, there is shown an example passive headset 100 that may present audio output by an audio source such as a home audio system, a television, a car stereo, a personal media player, a gaming console, desktop computer, laptop computer, tablet or smartphone. The headset 100 may be passive in that it does not have its own power supply and is instead powered by a signal from the amplifier 130. The headset 100 comprises a headband 102, a microphone boom 106 with microphone 104, ear cups **108*a* and 108*b* which surround speakers 116*a* and 116*b*, connector 114, an audio cable 115, light emitting diodes (LEDs) 118, user controls 112, and two instances of circuitry 150 (referenced as 150*a* and 150*b***).

Conventional headsets do not have the ability to shine LEDs due to the lack of a power source to drive the LEDs and the absence of any control signals to toggle them. The passive headset 100 illustrates a truly passive headset that features dynamic LED control on the headset when coupled with an appropriately designed amplifier.

The microphone 104 may be operable to convert acoustic waves (e.g., the voice of the person wearing the headset) to electric signals for processing by circuitry in the amplifier 130. The speakers 116*a* and 116*b* are operable to convert electrical signals to sound waves, and may be powered by the incoming audio signals.

The user controls 112 may comprise buttons, switches, sliders, wheels, etc., for performing various functions. Example functions which the controls 112 may be configured to perform include: mute/unmute the microphone 104, control gain/volume of, and/or effects applied to, chat audio by the audio processing circuitry of the amplifier 130, control gain/volume of, and/or effects applied to, and game audio by the audio processing circuitry of the amplifier 130.

The connector 114 may be, for example, a connector for a removable audio cable, as opposed to the fixed audio cable 115. The LEDs 118 may be arranged at various locations around the passive headset 100, depending on the desired application. In an example embodiment, high frequency signals, above audio frequencies, for example, may be communicated to the passive headset 100 via the audio cable 115, or a removable cable (not shown) along with audio frequency signals for playback by the speakers in the passive headset 100.

Low pass filters in the circuitry 150 may be utilized to filter out the high frequency signals and pass the audio frequency signals to the speakers. High pass filters in the circuitry 150 may be utilized to filter out the audio signals and pass the high frequency signals to power circuitry, which may comprise diode rectifier circuits, for example, for generating voltages for driving the LEDs 118. In addition, the received high frequency signals may be configured to control the intensity and color of the LED light output for gaming and other purposes. In an example scenario, each LED, or each group of LEDs, may generate a different color. In another example scenario, the color of each LED may be configured through bias control. In this manner, the passive headset 100 may have dynamically controlled LEDs for intensity and color, for example.

An example implementation of the circuitry 150 is described below with reference to FIGS. 2 and 3.

Figure 2:
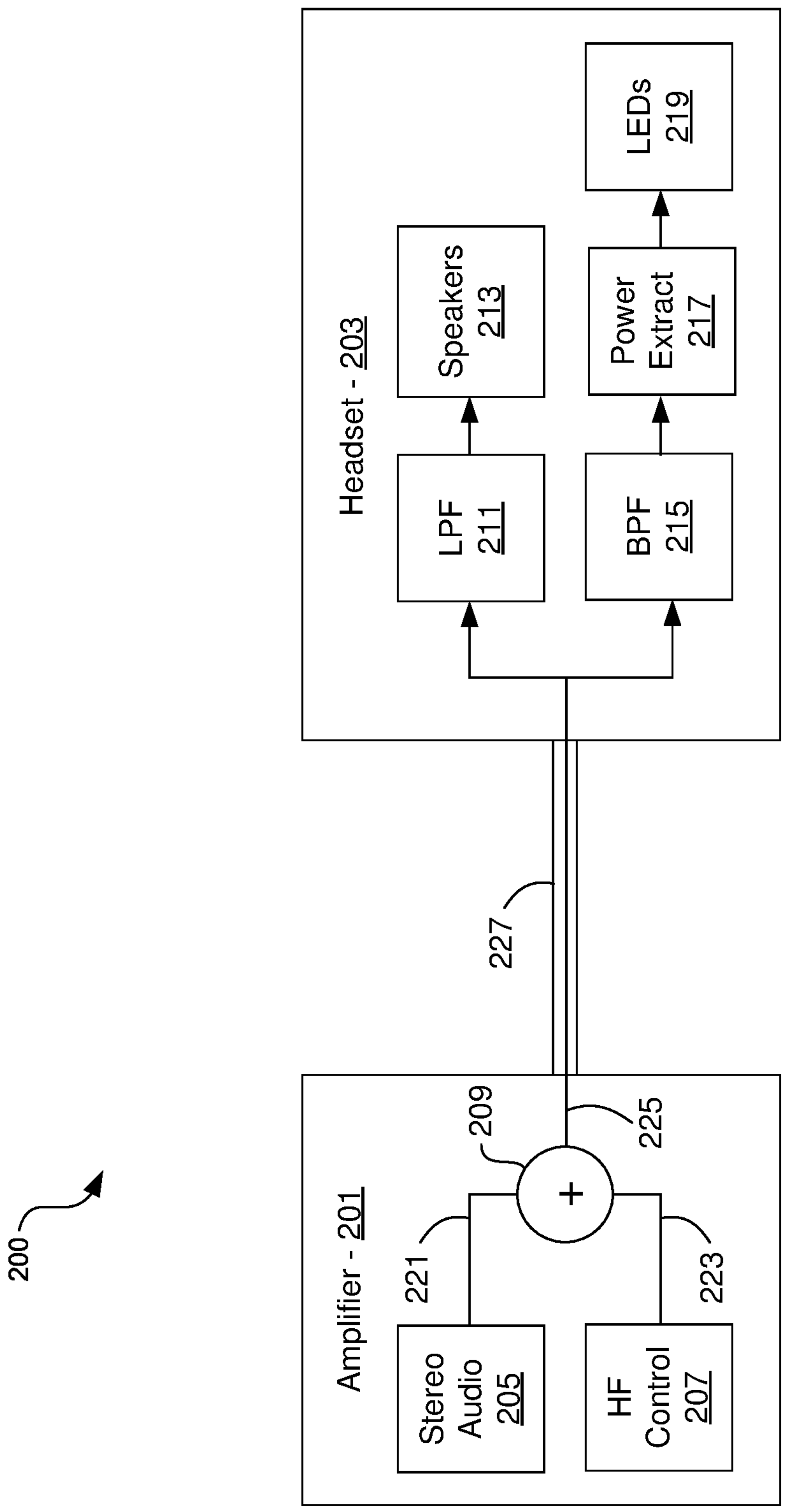
FIG. 2 depicts a block diagram of an example amplifier and a passive headset, in accordance with an example embodiment of the disclosure.

FIG. 2 depicts a block diagram of an example amplifier and a passive headset, in accordance with an example embodiment of the disclosure. Referring to FIG. 2, there is shown an amplifier 201, a passive headset 203, and an audio cable 227. The amplifier 201 comprises stereo audio module 205 and high frequency control module 207. There is also shown audio signals 221, high frequency LED control signals 223, and a summed signal 225.

The stereo audio module 205 may comprise audio amplifiers and other circuitry for generating the audio signals 221 to be communicated to the headset 203 with the high frequency control signals 223. In an example scenario, the audio signals 221 comprise left and right channel stereo signals and the audio cable 219 may comprise a standard 4-pole audio cable. However, other audio formats and cables are also applicable.

The high frequency control module 207 may comprise suitable circuitry, logic, and/or code for generating high frequency, i.e., above audio frequency, LED control signals 223 to be combined with the audio signals. The mixer 209 may comprise circuitry for summing the audio signals with the control signals before communicating them to the passive headset 203.

The passive headset 203 may comprise a low pass filter 211, speakers 213, band-pass filters 215, a power extracting module 217, and LEDs 219. The low pass filter 211 may comprise suitable circuitry for extracting the audio signals from the combined signal received from the amplifier 201 and attenuating the speaker driver vibrations at high frequencies, thereby communicating audio signals to the speakers 213 while blocking control/power signals intended for the LEDs 219.

The band-pass filters 215 may comprise suitable circuitry for allowing high frequency control signals to pass to the LEDs while blocking audio signals intended for the speakers 213. In an example scenario, the band-pass filter 215 may comprise a plurality of high Q filters, thereby enabling narrow band control signals to pass to the LEDs 219, where each LED 219, or each set of LEDs 219 may receive a separate control signal, e.g., for different color, intensity, or modulation frequency.

The power extraction module 217 may comprise circuitry for receiving the filtered high frequency control signals and generating one or more signals for controlling the LEDs 219. Accordingly, the power extraction module 217 may comprise diode rectifying circuits for converting a high frequency AC signal to a DC voltage for biasing the LED in an on state. In addition, the biasing state may change over time, with different frequency, intensity, and/or color, for example, configured via the biasing conditions generated by the power extraction module 217.

In operation, this example embodiment comprises generating high frequency control signals 223, above the audible range, in the amplifier 201, mixing the control signals 223 with audio signals 221 utilizing the mixer 209 in the amplifier 201, communicating the summed signal 225 to the headset 203 via the audio cable 227, which may comprise a standard 4 pole audio cable, for example, and then filtering of the high frequency control signals 223 to power and activate individual LEDs on the headset.

The amplifier 201 may generate sine wave tones above the audio band utilizing the high frequency control module 207, with a separate tone for each LED 219 to be driven in the headset 203, for example. In an example embodiment, for three LEDs in the headset 203, the control frequencies of 50 kHz, 70 kHz, and 90 kHz may each be generated and mixed with the audio signals 221. Existing digital to analog converters (DACs) can support sample rates up to 192 kHz, which would allow signals below 96 kHz to be generated easily. The control signals 223 may also, for example, be sent differentially across the L and R connections on the headset cable 227 to allow larger control signal amplitudes without limiting the desired audio signals 221.

The example embodiment of FIG. 2 enables passive headsets to shine LEDs in dynamic patterns when connected to amplifiers that contain the appropriate control circuitry. The LEDs may display an EQ or Level indication of the audio in the headset, or any of multiple different possible patterns. In an example implementation, for amplifiers with a USB or other suitable connection to a PC or gaming console, LED actions on the headset 203 could be synchronized with events occurring in a PC or console game. In this example implementation, games may issue special commands to, e.g., headset hardware on a kill streak or power up, which would correspond to a specific LED pattern on the headset.

In another example scenario, different color LEDs may be activated based on the received frequency, where each color LED may be powered by portions of the power extraction module 217 with a high-pass or band-pass filter tuned to a specific frequency, such that certain functions and/or information (e.g., type of game, rating of game (such as for parental guidance), level of game achieved, level of skill of player, etc.) may be indicated by the color of the activated LED. Alternatively, tunable LEDs may be configured to emit different colors based on the control current supplied to the diode.

Figure 3:
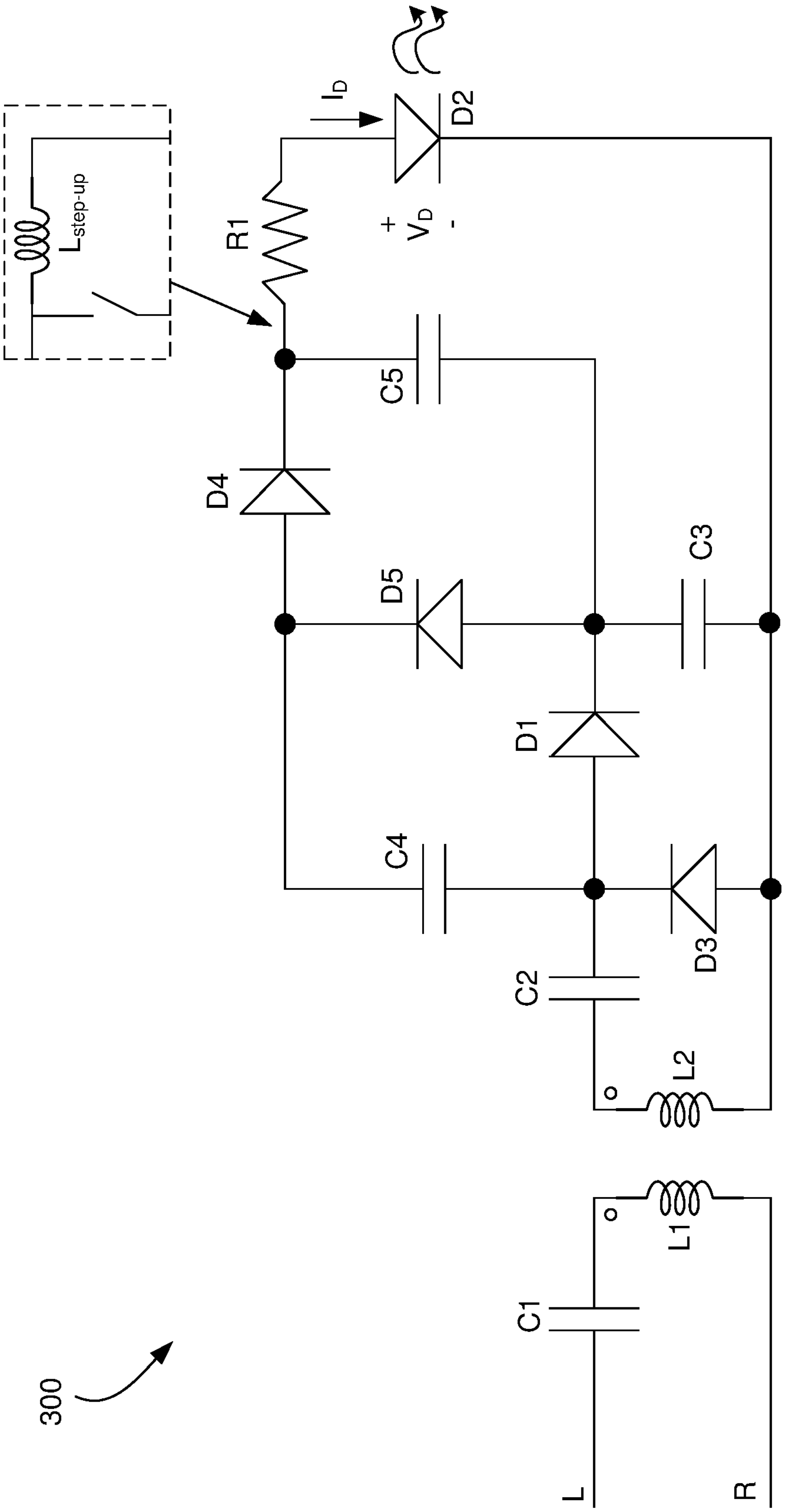
FIG. 3 illustrates one example of circuitry for extracting a voltage from a high frequency signal in a passive headset, in accordance with an example embodiment of the disclosure.

FIG. 3 illustrates one example of circuitry for extracting a voltage from a high frequency signal in a passive headset, in accordance with an example embodiment of the disclosure. Referring to FIG. 3, there is shown LED driver circuitry 300 comprising capacitors C1-C5, inductors L1 and L2, diodes D1-D5, and resistor R1. There is also shown LED D2 bias voltage $V_D$ and current $I_D$.

In an example scenario, the LED driver circuitry 300 comprises a high Q high-pass filter, C1 and L1, tuned to the control frequency configured for the LED D2. Although one LED D2 is shown in FIG. 3, it is noted that such driver circuitry may be utilized for each LED in the headset allowing for individual LED control.

The coupled inductors L1, L2 may comprise a step-up transformer acting to increase the voltage seen across the LED D2. Inductors L1 and L2 may be followed by a voltage multiplier circuit to increase the voltage and minimize effect of the power lost across the diodes.

The voltage multiplying circuit may comprise capacitors C2-C5 and diodes D1, D3, D4, and D5. The capacitors C2 and C4 may couple AC signals to the diode pairs D1/D3 and D4/D5, respectively, where both positive and negative potential from the signal operates to charge the capacitors C3 and C5, which sum to result in a higher DC voltage $V_D$ on the LED D2. The resistor R1 acts as the current limiting resistor for current $I_D$ through the LED D2.

The LED driver circuitry may provide LED control with a 1:1 coupled inductor and 3 stages in the voltage multiplier circuit, despite the large power losses across the diodes. In addition, a step up inductor, as illustrated by $L_{step\text{-}up}$ in the inset in FIG. 3, may be used to greatly increase the power efficiency to the LED.

In an example scenario, using three of the driver circuits of FIG. 3 in parallel with C1 and L1 tuned for different frequencies on each LED enables independent control of three different color LEDs in the headset with signals generated in the amplifier.

Figure 4:
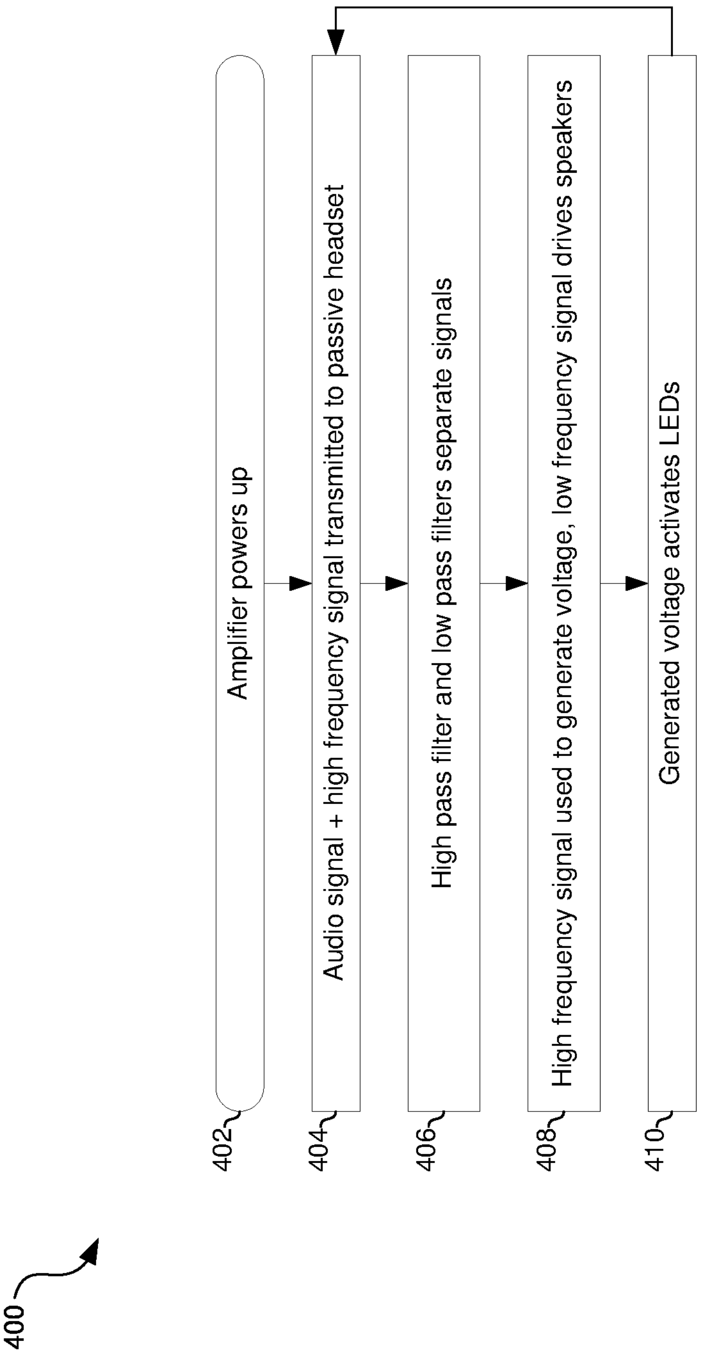
FIG. 4 is a flowchart illustrating an example process for driving LEDs in a passive headset.

FIG. 4 is a flowchart illustrating an example process for driving LEDs in a passive headset. In block 402, the amplifier powers up and generates audio signals and higher frequency signals, which may be summed together, and the summed signal may be communicated to the passive headset via an audio cable. In block 406, low and high-pass (or band-pass) filters in different circuitry paths may allow audio signals to pass in one path while the above-audio frequency signals may pass through the other path. In block 408, the high frequency signals that pass in one circuitry path may be used to generate one or more voltages for driving LEDs, while the audio signal passed in the other circuitry path may drive speakers in the passive headset. The high frequency signal may be stepped up using coupled inductors and voltage boost circuitry, and rectified to generate a DC voltage. In block 410, the LEDs may be activated by the one or more generated voltages. The one or more generated voltages may also comprise a time-varying component to provide intensity change and/or oscillations, or may have variable magnitude to adjust intensity based on an application output, such as volume, for example.

In an example embodiment of the disclosure a passive headset with dynamically controlled LEDs is disclosed and may comprise a passive headset comprising speakers, one or more light emitting diodes (LEDs), and LED driver circuitry, the headset being operable to: receive an electrical signal comprising an audio signal and an LED control signal, filter out the LED control signal from the received electrical signal and communicate a resulting output audio signal to the speakers, filter out the audio signal from the received electrical signal and communicate a resulting output LED control signal to the LED driver circuitry. A bias voltage may be generated for each of the one or more LEDs utilizing the LED driver circuitry and the output LED control signal, and a light output of the LED may be configured utilizing the generated bias voltage.

An amplifier coupled to the headset via an audio cable may generate the received electrical signal. The amplifier may comprise audio signal generation circuitry and control signal generation circuitry. The amplifier may comprise a mixer that sums an audio signal from the audio signal generation circuitry with a control signal from the control signal generation circuitry. The electrical signal may be received via a 4-pole audio cable. The LED driver circuitry may comprise voltage multiplier circuitry that comprises one or more stages, each stage with a capacitor and a diode pair. The LED driver circuitry may comprise a step-up transformer. The headset may comprise a low-pass filter that filters out the LED control signal and allows the audio signal to pass. The headset may comprise a band-pass filter that filters out the audio signal and allows the LED control signal to pass to the LED driver circuitry. The band-pass filter may comprise a plurality of filters each tuned to a LED control signal for a different LED of the one or more LEDs.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system, comprising:

a speaker;

a light emitting diode (LED) device; and a batteryless device, wherein the batteryless device is passive and operable to:

receive an electrical signal comprising an audio signal and an LED control signal, transfer the audio signal to the speaker, and generate, from the LED control signal, a bias voltage for the LED device.

2. The system of claim 1, wherein an amplifier coupled to the batteryless device, via an audio cable, generates the electrical signal.

3. The system of claim 2, wherein the amplifier comprises audio signal generation circuitry and control signal generation circuitry.

4. The system of claim 2, wherein the amplifier combines the audio signal with the control signal.

5. The system of claim 1, wherein the batteryless device is operable to receive the electrical signal via a 4-pole audio cable.

6. The system of claim 1, wherein the batteryless device comprises an LED driver circuit with a step-up transformer.

7. The system of claim 1, wherein the batteryless device comprises a low-pass filter that filters out the LED control signal and allows the audio signal to pass.

8. The system of claim 1, wherein the batteryless device comprises a band-pass filter that filters out the audio signal.

9. The system of claim 8, wherein the band-pass filter comprises a plurality of filters each tuned to a different frequency according to different LEDs of the LED device.

10. The system of claim 1, wherein the LED device utilizes the bias voltage for one or more LEDs.

11. A method, comprising:

receiving, via a batteryless device that is passive, an electrical signal comprising an audio signal and a light emitting diode (LED) control signal;

transferring the audio signal to a speaker; and generating, from the LED control signal, a bias voltage for an LED device.

12. The method of claim 11, comprising generating the electrical signal via an amplifier coupled to the batteryless device.

13. The method of claim 12, wherein the amplifier comprises audio signal generation circuitry and control signal generation circuitry.

14. The method of claim 12, comprising combining the audio signal with the control signal, via the amplifier.

15. The method of claim 11, wherein the batteryless device is operable to receive the electrical signal via a 4-pole audio cable.

16. The method of claim 11, wherein the batteryless device comprises an LED driver circuit with a step-up transformer.

17. The method of claim 11, comprising filtering out the LED control signal via a low-pass filter in the batteryless device.

18. The method of claim 11, comprising filtering out the audio signal via a band-pass filter in the batteryless device.

19. The method of claim 18, wherein the band-pass filter comprises a plurality of filters each tuned to a different frequency according to different LEDs of the LED device.

20. The method of claim 11, comprising utilizing the bias voltage for one or more LEDs of the LED device.

* * * * *